United States Patent [19]
Pierle

[11] 3,837,445
[45] Sept. 24, 1974

[54] PISTON ASSEMBLY FOR A SHOCK ABSORBER

[75] Inventor: Willy R. J. Pierle, Tienen, Belgium

[73] Assignee: Monroe Belgium N.V., Sint-Truiden, Belgium

[22] Filed: Jan. 30, 1973

[21] Appl. No.: 327,933

[52] U.S. Cl.............. 188/322, 137/513.7, 188/282, 188/320
[51] Int. Cl............................................. F16f 9/34
[58] Field of Search .......... 188/282, 317, 320, 322; 137/513.7, 493.9, 493.8

[56] References Cited
UNITED STATES PATENTS

| | | | |
|---|---|---|---|
| 2,087,451 | 7/1937 | Rossman et al................. | 188/317 X |
| 3,199,636 | 8/1965 | De Carbon ......................... | 188/317 |
| 3,256,961 | 6/1966 | De Carbon ......................... | 188/317 |
| 3,312,312 | 4/1967 | De Carbon ......................... | 188/317 |

Primary Examiner—George E. A. Halvosa
Attorney, Agent, or Firm—Harness, Dickey & Pierce

[57] ABSTRACT

The invention relates to a piston assembly for a direct acting hydraulic shock absorber including a cylinder containing damping fluid and a reciprocal piston rod. The assembly comprises a piston member formed with a plurality of circumferentially spaced axially extending flow ports and an annular cavity having inner and outer circular walls, the inner wall defined by a generally cylindrical body portion concentric with and surrounding the piston rod, the outer wall including an annular peripheral shoulder extending axially from the piston and defining a flat, radially extending sealing surface, the surface being formed with a first plurality of circumferentially spaced bleed openings. A washer concentric with the piston rod and the inner cylindrical projection is carried in fixed position with relation thereto and spaced axially from the cylindrical body portion. A thin resilient valve disc is positioned across the cavity and has its radially outer marginal portion seated against the surface and adapted for movement in a first axial direction away from the shoulder; the radially inner marginal portion of the valve disc being seated against the washer and adapted for movement away from the washer in a second axial direction. A disc shaped metering element is positioned immediately axially inwardly of the first named washer in the space between the first named washer and the cylindrical body portion, the inner diameter of the valve member and the outer diameter of the metering element defining a second plurality of circumferentially spaced bleed openings therebetween, whereby movement of the piston member in one direction causes pressure of damping fluid against the valve member in the opposite direction and causes the valve disc to yieldably flex away from one or its seats and provide an annular opening between the adjacent portions of the valve member and the seat for communicating fluid to and from the ports.

4 Claims, 6 Drawing Figures

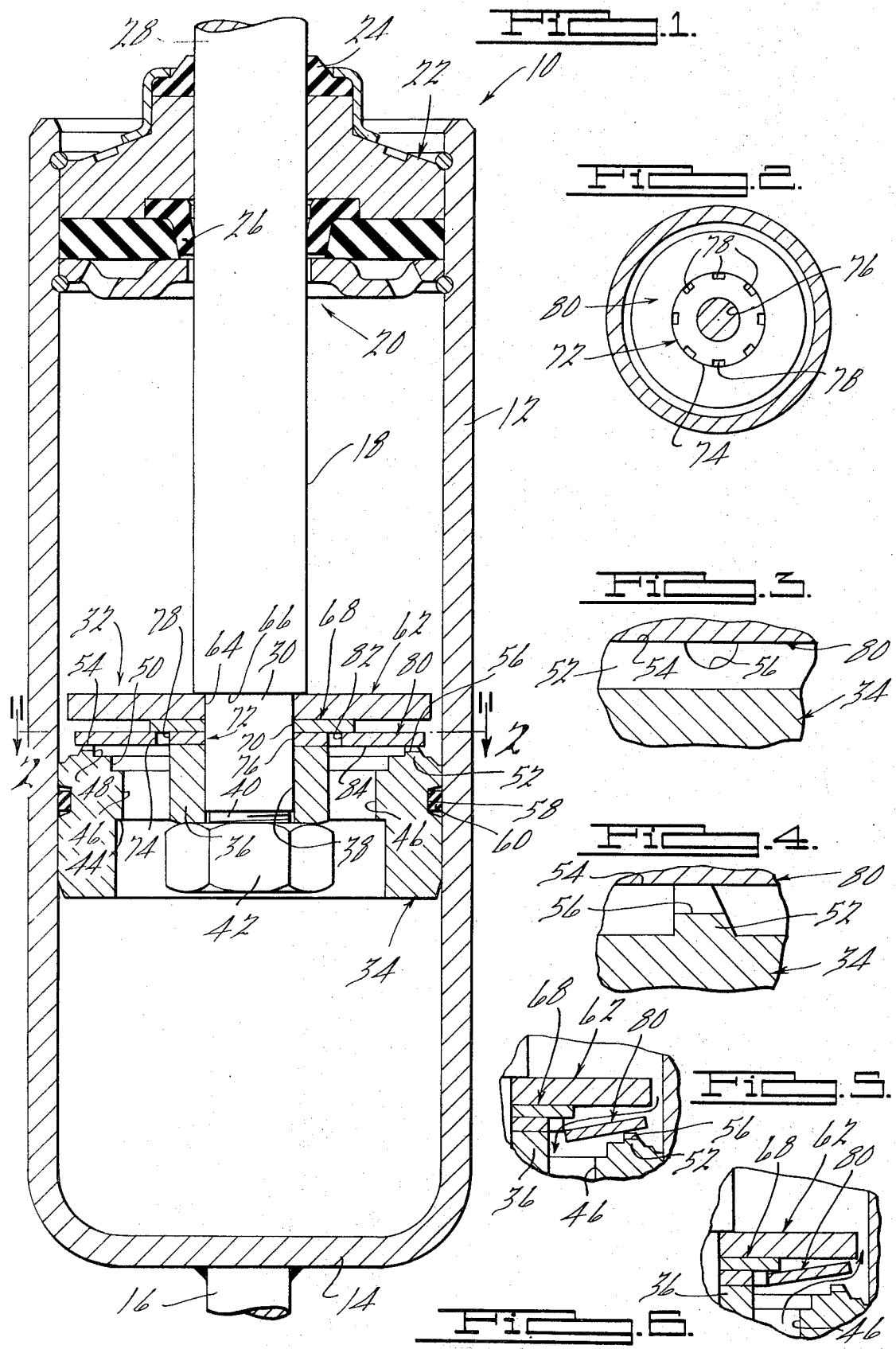

PISTON ASSEMBLY FOR A SHOCK ABSORBER

SUMMARY OF THE INVENTION

The present invention relates generally to hydraulic shock absorbers, and more particularly, to a new and improved piston assembly for use in vehicular shock absorbers.

It is accordingly a general object of the present invention to provide a new and improved piston assembly for use in hydraulic direct acting shock absorbers, which assembly utilizes a single disc-like valve member that is of an extremely simple construction and is designed so as to minimize operational vibration and noise to the extreme.

It is another object of the present invention to provide a piston assembly, as above described, which may be easily modified to vary rebound and compression control characteristics in accordance with various specified applications.

It is a related object of the present invention to provide a piston assembly which may have the low speed control characteristics thereof varied in an extremely simple manner and in a way that will not adversely affect the high speed control characteristics thereof.

It is yet another object of the present invention to provide a new and improved piston assembly that is economical to manufacture and will have a long and reliable operational life.

Other objects and advantages of the present invention will become apparent from the following detailed description taken in conjunction with the accompanying drawing.

BRIEF DESCRIPTION OF THE DRAWING

FIG. 1 is an elongated cross-sectional view of a shock absorber incorporating the new and improved piston assembly of the present invention;

FIG. 2 is a transverse cross-sectional view taken substantially along the line 2—2 of FIG. 1;

FIG. 3 is an enlarged fragmentary cross-sectional view illustrating a portion of the piston assembly shown in FIGS. 1 and 2;

FIG. 4 is another enlarged fragmentary cross-sectional view of a portion of the piston assembly shown in FIGS. 1 and 2;

FIG. 5 is an enlarged fragmentary view of the piston assembly of the present invention as shown with the valve member thereof displaced during a rebound cycle; and FIG. 6 is an enlarged fragmentary view of the piston assembly of the present invention as shown with the valve member thereof displaced during a compression cycle.

DESCRIPTION OF A PREFERRED EMBODIMENT

Referring now in detail to the drawing and in particular to FIG. 1 thereof, a shock absorber 10, in accordance with one preferred embodiment of the present invention, is shown generally as comprising an elongated cylindrical or tubular housing 12 which is closed at the lower end thereof by means of an end wall 14. Mounted on the end wall 14 is a suitable attachment element or means 16 adapted to function in operatively securing the lower end of the shock absorber 10 to an associated portion of a vehicle chassis, frame or axle member, as is well known in the art. An elongated piston rod 18 is reciprocally mounted within the housing 12 and is guided for reciprocal movement by means of a rod guide assembly 20 fixedly secured within the upper end of the housing 12. The assembly 20 comprises a rod guide member 22 which is provided with upper and lower fluid sealing means 24 and 26, respectively, for preventing the escape of hydraulic fluid from within the housing 12 and also to prevent foreign material, such as road dirt, moisture or the like, from entering into the interior of the shock absorber 10. The piston rod 18 includes an upper end section 28 which is adapted for attachment to an associated portion of an automotive vehicle, or the like, while the lower end of the piston rod, herein designated by the numeral 30, is provided with a piston assembly 32 which is constructed in accordance with the principles of the present invention, as will hereinafter be described in detail. As will be appreciated by those skilled in the art, the piston assembly 32 and piston rod 18 are adapted to reciprocate within the tubular housing 12 and thereby damp oscillatory movement of the associated sprung portion of an automotive vehicle relative to the unsprung portion thereof, whereby to improve vehicular ride characteristics.

Referring now in detail to the construction of the piston assembly 32, as best seen in FIG. 1, said assembly comprises a piston member 34 which is circular in cross-section and comprises a central body section 36 that defines a central axially extending bore 38. The bore 38 is adapted to nestingly receive an externally threaded reduced diameter end portion 40 formed on the lower end of the piston rod 18 in a manner such that the piston member 34 may be retained upon the lower end of the rod 18 by means of a suitable nut or similar fastening element 42 threadedly secured upon the end portion 40. The lower or underside of the piston member 34 is formed with a concentric counterbore 44 which extends upwardly and is communicable via a plurality of circumferentially spaced, axially extending flow ports 46 with a cavity formed by a pair of step shaped counterbores 48 and 50 formed on the upper side of the piston member 34. Thus, fluid may be communicated from the lower end of the housing 12 via the counterbore 44, flow ports 46 and counterbores 48 and 50 to the upper end of the housing 12 and vice versa, as will be described.

The upper side of the piston member 34 is formed with an annular, axially upwardly extending shoulder 52 which defines a generally flat radially disposed seating surface 54 on the upper side thereof. The shoulder 52 is formed with a plurality of circumferentially spaced, axially downwardly extending recesses or notches, generally designated by the numeral 56, through which fluid may be communicated between the upper and lower ends of the housing 12 at such time as a valve member, hereinafter to be described, is engaged or seated upon the surface 54.

The periphery of the piston member 34 is also formed with an annular, radially inwardly extending recess 58 at a position generally axially aligned with the plurality of ports 46, which recess 58 is exposed to the inner periphery of the housing member 12 and is provided with a suitable O-ring or similar type sealing element 60 adapted to provide a fluid tight sliding seal between the outer periphery of the piston member 34 and the inner periphery of the housing 12, whereby to assure against fluid flowing between the outer periphery of the piston member 34 and the inner periphery of the housing member 12 upon reciprocal movement of the piston assembly 32 within the shock absorber 10.

Disposed above the piston member 34 is a generally disc shaped support washer 62 which is formed with a central bore 64 through which the lower end portion 30 of the piston rod 18 extends. The upper side of the support washer 62 is adapted to bear against a generally radially extending annular shoulder 66 formed at the juncture of the piston rod section 30 and the main portion of the piston rod 18. The support washer 82 extends radially outwardly from the piston rod 18 to a position closely adjacent the inner periphery of the housing 12, as illustrated. Mounted directly below the support washer 62 is a spacer washer, generally designated by the numeral 68, which, like the washer 62, is of a generally disc-shaped configuration and is formed with a central bore 70 through which the lower end portion 30 of the piston rod 18 extends. As shown, the spacer washer 68 is considerably smaller in diameter than the support washer 62 and is of approximately one-half the axial thickness of the washer 62. The spacer washer 68 is adapted to function in axially spacing the support washer 62 from a generally disc-shaped metering element 72 which is formed with an outer peripheral annular surface 74 and a central annular bore 76, the latter of which is arranged co-axially of the washers 68 and 62 and which is adapted to have the end portion 30 of the piston rod 18 extend downwardly therethrough. The outer peripheral surface 74 of the metering element 72 is formed with a plurality of circumferentially spaced, radially inwardly extending recesses or notches 78 which are located below the spacer washer 68 and are in general axial alignment with the plurality of flow ports 46 formed in the piston member 34. Disposed radially outwardly from the metering element 72 is an annular valve disc 80 which is formed with a central annular bore 82 which is of substantially the same diameter as the diameter of the surface 74. The lower side of the valve disc 80, herein designated by the numeral 84, is adapted for engagement or seating against the surface 54, while the upper surface of the disc 80 is adapted for engagement or seating with the underside of the washer 68. As will hereinafter be described in detail, upon movement of the piston assembly 32 upwardly within the housing 12, the radially innermost portion of the valve disc 80 will become unseated from the underside of the washer 68, whereby fluid may flow downwardly through the flow ports 46. Similarly, upon downward movement of the assembly 32, the radially outermost portion of the valve member 80 will move upwardly away from the seating surface 54 to permit fluid to pass upwardly from the ports 46 to the upper end of the housing 12.

Referring now in detail to the operation of the piston assembly 32 of the present invention, at slow speeds, fluid may pass upwardly and downwardly through the piston assembly 32 via the plurality of recesses 56 formed in the shoulder 52, which fluid will pass either to or from the plurality of flow ports 46, with the valve member 80 being substantially immobilized between the surface 54 and the underside of the washer 68. At such time as the assembly 32 moves downwardly, i.e., during a compression stroke, at some predeterminately greater speed, the radially outermost portion of the valve member 80 will move upwardly away from the seating surface 54, as shown in FIG. 6, whereby to permit fluid to flow upwardly through the counterbore 44, flow ports 46, counterbores 48, 50 and between the underside of the valve member 80 and the seating surface 54.

Similarly, during a rebound stroke or cycle when the piston assembly 32 moves upwardly within the housing 12 at some predetermined speed, the radially innermost portion of the valve member will move downwardly from the position shown in FIG. 1 to the position shown in FIG. 5, whereby fluid may pass downwardly between the upper side of the piston member 80 and the underside of the washer 68. This fluid will then pass through the plurality of recesses 78 defined by the metering element 72, and thereafter downwardly through the counterbores 48, 50 flow ports 46 and finally through the counterbore 44 into the lower end of the housing 12.

In accordance with the principles of the present invention, and in particular, due to the particular geometry of the valve member 80, the compression control of the piston assembly 32 is automatically lower than the rebound control, an operational characteristic which has been found to be highly desirable on certain types of automotive vehicles; however, if just the opposite performance is deemed necessary, it is possible to merely reverse or turn the entire piston assembly 32 upsidedown and remount the same upon the lower end of the piston rod 18.

It will also be noted that the thickness of the metering element 72 is predeterminately different than the thickness of the valve member 80, whereby the valve member 80 may be given a preselected pre-load so that the same will not open and/or close until some predetermined fluid pressure acts thereon.

A particular feature of the present invention resides in the fact that the size and number of the recesses 56 may be varied to change the low speed control of the assembly 32, with such variation not having any serious influence on the high speed control of the assembly 32. Additionally, the width and number of recesses 78 on the element 72 may be varied to provide for highly accurate control of the rebound performance of the assembly 32. Another feature of the present invention resides in the fact that the piston assembly 32 will exhibit highly superior noise and vibration characteristics as compared to the prior known piston designs. Still another feature of the piston assembly 32 of the present invention resides in its simplicity of construction and operation, whereby to provide for substantial economies of manufacture, as compared to various multiple disc piston designs and even some single disc designs known in the prior art.

While it will be apparent that the preferred embodiment illustrated herein is well calculated to fulfill the objects above stated, it will be appreciated that the present invention is susceptible to modification, variation and change without departing from the scope of the invention.

I claim:

1. A piston assembly for a direct acting hydraulic shock absorber including a reciprocal piston rod and a cylinder containing damping fluid,
   said assembly comprising a piston member formed with a plurality of circumferentially spaced, axially extending flow ports and an annular cavity communicable with said ports and defined by inner and outer circular walls, said inner wall defined by a generally cylindrical body portion concentric with and surrounding the piston rod, said outer wall including an annular shoulder extending axially of said piston rod and defining a first flat, radially extending seating surface, said surface being formed with a first plurality of circumferentially spaced bleed openings extending axially downwardly from said surface and extending radially entirely through said shoulder, a flat annular spacer member arranged concentric with said piston rod and said cylindrical body portion and carried in fixed relation thereto and spaced axially from said cylindrical body portion, the side of said spacer member facing said first seating surface defining a second radially extending seating surface, a thin resilient valve disc positioned across said cavity and having its radially outer marginal portion seated against said first seating surface and adapted for movement in a first axial direction away from said shoulder, the radially inner marginal portion of said valve disc being seated against said second seating surface and adapted for movement away from said second surface in a second axial direction, the outer diameter of said spacer member being greater than the diameter of said body portion and greater than the inner diameter of said valve disc, a flat disc-shaped metering element positioned axially between said spacer member and said cylindrical body portion, said element lying in the same general radial plane as said valve disc and having an outer diameter less than the outer diameter of said spacer member and approximately equal to the inside diameter of said valve member, with said spacer member and metering element being independently interchangeable in order to vary the axial spacing between said seating surfaces, said metering element providing a second plurality of bleed opening which are formed by circumferentially spaced, radially inwardly extending recesses arranged around the outer periphery of said element, the outer diameter of said metering element being smaller than the outer diameter of said spacer member, with one axial end of each of said second plurality of bleed openings being covered by the adjacent side of said spacer member, whereby fluid flow through said second plurality of bleed openings is prevented when said second seating surface is engaged by the adjacent side of said valve member, with a substantially uniform controlled amount of fluid flow through said second plurality of openings being permitted when the inner peripheral portion of said valve member is deflected axially away from said second seating surface any distance less than the axial thickness of said metering element, and a fluid flow substantially greater than said uniform controlled amount thereof is permitted when said inner peripheral portion of said valve member is deflected axially away from said second seating surface a distance greater than the axial thickness of said metering member, said uniform controlled amount of fluid flow being determined solely by the cross-sectional size of said second plurality of bleed openings and being substantially independent of the position of said inner peripheral portion of said valve member during the time said portion is deflected an axial distance less than said axial thickness of said metering member.

2. The invention as set forth in claim 1 wherein a predetermined differential thickness exists between said metering element and said valve disc and providing a pre-load on said valve disc.

3. The invention as set forth in claim 1 which includes a generally disc-shaped support washer interposed between said first mentioned spacer member and said shoulder and arranged concentrically of said piston member.

4. The invention as set forth in claim 1 wherein the radially innermost portion of said valve disc deforms downwardly during a rebound cycle to communicate fluid from the interior of said housing above said assembly along a flow path above said valve disc and through said second plurality of openings to a location below said assembly, and wherein the radially utermost portion of said valve disc moves upwardly away from said seating surface during a compression cycle to permit fluid to flow upwardly through said cavity, between the underside of said valve disc and said seating surface to the portion of said housing above said piston assembly.

* * * * *

UNITED STATES PATENT OFFICE
CERTIFICATE OF CORRECTION

Patent No. 3,837,445      Dated September 24, 1974

Inventor(s) Willy R. J. Pierle

It is certified that error appears in the above-identified patent and that said Letters Patent are hereby corrected as shown below:

Column 6, line 33, delete "first mentioned".

Signed and sealed this 1st day of April 1975.

(SEAL)
Attest:

RUTH C. MASON
Attesting Officer

C. MARSHALL DANN
Commissioner of Patents
and Trademarks